(No Model.)

M. CAMPBELL.
Coffee Pot.

No. 242,269. Patented May 31, 1881.

Witnesses.
A. Ruppert.
C. M. Connell

Inventor.
M. Campbell
Holloway & Blanchard
Att'ys

N. PETERS, Photo-Lithographer, Washington, D. C.

UNITED STATES PATENT OFFICE.

MARVIN CAMPBELL, OF SOUTH BEND, INDIANA.

COFFEE-POT.

SPECIFICATION forming part of Letters Patent No. 242,269, dated May 31, 1881.

Application filed March 21, 1881. (No model.)

*To all whom it may concern:*

Be it known that I, MARVIN CAMPBELL, a citizen of the United States, residing at South Bend, in the county of St. Joseph and State of Indiana, have invented certain new and useful Improvements in Coffee-Pots; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in coffee-pots in which the extract is made by allowing water to percolate through the ground coffee and be then returned to the upper surface thereof and again passed through it, and so on, until all of the strength of the coffee has been extracted.

The object of my improvement is to provide a novel combination of devices for the purpose hereinafter specified. I accomplish this object in the manner illustrated in the accompanying drawings, in which—

Figure 1:
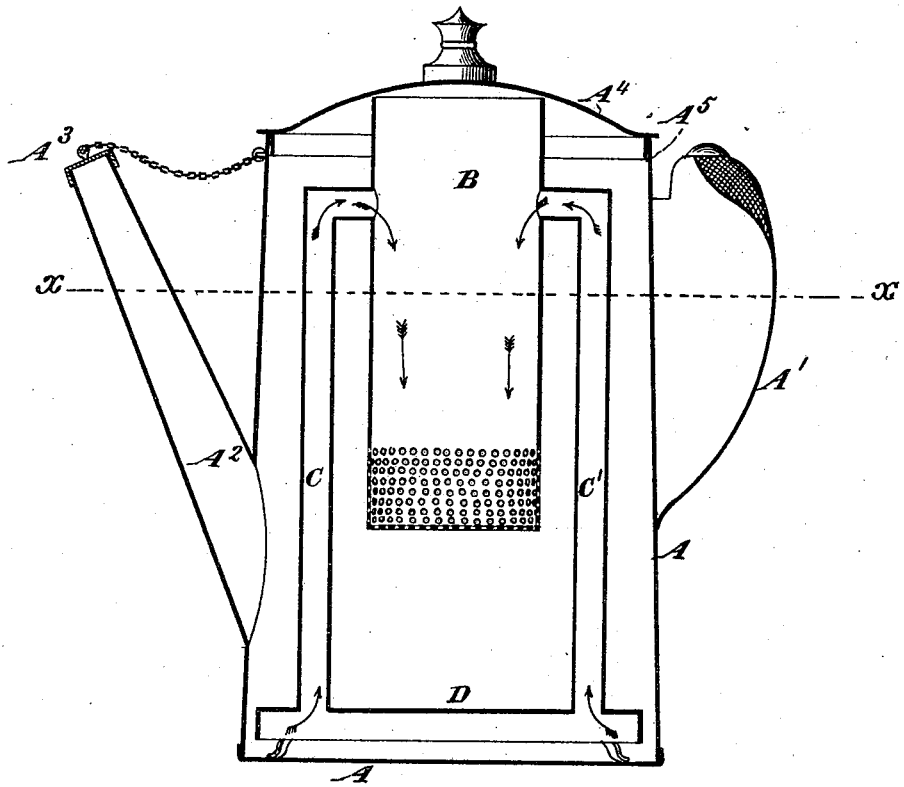
Figure 2:
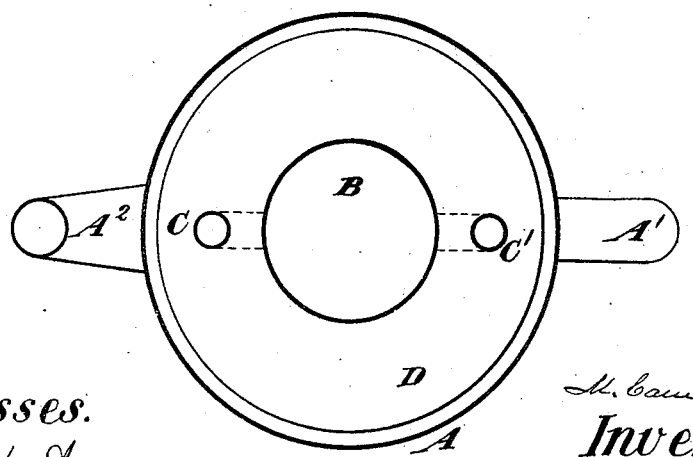

Figure 1 is a sectional elevation, showing a coffee-pot having in it a vessel for containing the coffee to be steeped and the water to be passed through it, a disk for supporting it in the pot, and pipes for conducting the water from the lower portion of the pot back to the vessel containing the coffee; and Fig. 2 is a sectional view on line $x\ x$ of Fig. 1, showing the pot, its handle and spout, the vessel for holding the coffee, and the return water-pipes.

Similar letters refer to similar parts in both of the figures.

I am aware that pots for extracting the strength or aromatic substance from tea and coffee have heretofore been made, such pots having an interior suspended vessel for receiving the substance to be steeped, and pipes for returning the water that has once passed through such substance, such a device being shown in the patent of C. C. Kribs, No. 200,205, of February 12, 1878; but this differs from mine in the following-named particulars: First, the vessel therein shown, which contains the material to be steeped, is conical in form, and of a more or less porous material throughout its entire length, the objection to which is that the water used for extracting the strength of the material passes out through the perforations in the sides of the vessel to a very great extent, and hence will not travel through the entire body of the material, the consequence of which will be that only a small proportion of its substance will be extracted. In my pot the vessel which contains the material to be steeped is capable of containing a considerable amount of water, which, owing to the fact that it can only escape by passing down through the material to the perforations in the lower end of the vessel, is retained much longer in contact with the coffee, and thus rendered capable of more thoroughly extracting its strength. Another difference between my device and that shown in the patent of Kribs, is that in mine nearly all of the steam generated in the pot is thrown into the vessel which contains the coffee, and, owing to its construction, carried above the line of egress, which is the lower edge of the rim of the cover $A^5$, and so the aroma is retained in the pot, as above explained.

I am also aware of the patents granted, respectively, to J. H. Hunt on the 7th day of May, 1878, and numbered 203,275, and to Mr. DeGraff on the 25th of January, 1870, numbered 99,068. I do not claim separately any of the devices there shown, or the combinations there illustrated.

In constructing coffee-pots with my improvements attached I provide any suitable vessel, A, for receiving the interior parts, it being provided with a handle, A', and a spout, $A^2$, the latter being provided with a tightly-fitting cap, $A^3$, for preventing the escape of steam at that point. There is also provided a tightly-fitting cover, $A^4$, which, by preference, is rounded on top, as shown, and is provided with a flange, which fits into the top of the body A, so as to make at the point $A^5$ as nearly as possible a steam-tight joint.

The above-named parts may be of any preferred form, and as they, when separately considered, form no part of my present invention, they need not be more particularly described.

The interior parts of this pot, in which my invention is embodied, consist of a vessel, B, the upper end of which is made to approach to, or as nearly as possible to, the under sur-